(12) United States Patent
Totsuka et al.

(10) Patent No.: US 9,191,765 B2
(45) Date of Patent: Nov. 17, 2015

(54) IN-VEHICLE AUDIO DEVICE

(71) Applicant: DENSO CORPORATION, Kariya, Aichi-pref (JP)

(72) Inventors: Seiji Totsuka, Tokai (JP); Hiroshi Inou, Anjo (JP); Teppei Miyake, Kariya (JP)

(73) Assignee: DENSO CORPORATION, Kariya (JP)

( * ) Notice: Subject to any disclaimer, the term of this patent is extended or adjusted under 35 U.S.C. 154(b) by 144 days.

(21) Appl. No.: 14/150,962

(22) Filed: Jan. 9, 2014

(65) Prior Publication Data

US 2014/0198933 A1 Jul. 17, 2014

(30) Foreign Application Priority Data

Jan. 11, 2013 (JP) ................. 2013-003801

(51) Int. Cl.
*H04B 1/00* (2006.01)
*H04S 7/00* (2006.01)

(52) U.S. Cl.
CPC .... *H04S 7/30* (2013.01); *H04S 7/00* (2013.01)

(58) Field of Classification Search
CPC ... H04S 2420/01; H04S 2400/11; H04S 7/30; H04S 7/301; H04S 7/303
USPC .......... 381/1, 17, 18, 71.4, 77–82, 86, 97, 98, 381/104, 110, 300, 302, 310, 312, 313; 700/94
See application file for complete search history.

(56) References Cited

U.S. PATENT DOCUMENTS

| | | | |
|---|---|---|---|
| 5,581,618 A | 12/1996 | Satoshi et al. | |
| 5,822,438 A | 10/1998 | Sekine et al. | |
| 6,498,856 B1 | 12/2002 | Itabashi et al. | |
| 6,760,451 B1 | 7/2004 | Craven et al. | |
| 8,422,693 B1 * | 4/2013 | Daily et al. | 381/86 |
| 2009/0169037 A1 | 7/2009 | Park et al. | |
| 2010/0036563 A1 | 2/2010 | Inou et al. | |
| 2014/0023211 A1 * | 1/2014 | Inou et al. | 381/302 |

FOREIGN PATENT DOCUMENTS

| | | |
|---|---|---|
| JP | H02-082606 U | 6/1990 |
| JP | H02-258444 A | 10/1990 |
| JP | H05-8691 A | 1/1993 |
| JP | 06-051759 A | 2/1994 |
| JP | H07-61257 A | 3/1995 |
| JP | H07-261775 A | 10/1995 |

(Continued)

*Primary Examiner* — Vivian Chin
*Assistant Examiner* — Friedrich W Fahnert
(74) *Attorney, Agent, or Firm* — Posz Law Group, PLC

(57) ABSTRACT

In a structure of an in-vehicle audio device, the audio system has an audio signal supplying section, an audio signal processing section, a balance adjustment section and an audio signal output section. A right audio signal processing section and a left audio signal processing section in the audio signal processing section perform a process of filtering audio signals supplied from the audio signal supplying section on the basis of a transfer function. The transfer function contains a head related transfer function H(s), a space transmission compensation function G0(s)$^{-1}$ and a vehicle height compensation function G1(s). The space transmission compensation function G0(s)$^{-1}$ is an inverse function of a space transfer function G0(s). A filtering process for the audio signal is performed by using the transfer function to guide a driver's visual line to be decreased when a vehicle height is high, and increased when the vehicle height is low.

9 Claims, 5 Drawing Sheets

(56) References Cited

FOREIGN PATENT DOCUMENTS

| | | |
|---|---|---|
| JP | H09-76799 A | 3/1997 |
| JP | 2001-028799 A | 1/2001 |
| JP | 2004-135023 A | 4/2004 |
| JP | 2007-264455 A | 10/2007 |
| JP | 2009-043003 A | 2/2009 |
| JP | 2009-166700 A | 7/2009 |
| JP | 2009-530669 A | 8/2009 |
| JP | 2010-034755 A | 2/2010 |
| JP | 2010-067020 A | 3/2010 |
| JP | 4735676 B2 | 7/2011 |
| JP | 2014-21770 A | 2/2014 |
| JP | 2014-134503 A | 7/2014 |

\* cited by examiner

IN-VEHICLE AUDIO DEVICE

CROSS-REFERENCE TO RELATED APPLICATION

This application is related to and claims priority from Japanese Patent Application No. 2013-3801 filed on Jan. 11, 2013, the contents of which are hereby incorporated by reference.

BACKGROUND OF THE INVENTION

1. Field of the Invention

The present invention relates to in-vehicle audio devices, to be mounted to motor vehicles, capable of generating sound image at a localized position to which a visual line of a driver of a host vehicle is guided.

2. Description of the Related Art

There have been known techniques for generating a sound image, by using a plurality of speakers mounted to a motor vehicle, to be localized or positioned in a direction of a visual line of a driver of the motor vehicle, toward which an attention attraction object (as a target object) to pay attention to is present. This conducts the driver of the motor vehicle to pay his attention toward the target object. However, in general, conventional techniques consider a horizontal direction only, not a vertical direction when generating a sound image at a localized position in a direction of the visual line of the driver. Accordingly, there is a possibility of it being difficult to correctly and quickly guide the visual line of the driver to the localized position of the generated sound image because the localized position of the generated sound image becomes too high or low due to a mounted position of each of the speakers arranged in a passenger compartment of the motor vehicle and a height of the motor vehicle.

In order to solve such a problem of the conventional technique, there is another conventional technique, for example, Japanese patent laid open publication No. 2009-166700, which discloses a technique in which plural speakers are arranged in a vertical direction of a passenger compartment of a motor vehicle in order to adjust a localized position of a sound image along a vertical direction of the motor vehicle.

However, the conventional technique is required to arrange plural speakers at different positions along a vertical direction of the passenger compartment of the motor vehicle. It is therefore difficult to apply such a technique to many currently available motor vehicles which are equipped with speakers of a usual type, and is required to arrange one or more additional speakers in the passenger compartment of the motor vehicle.

SUMMARY

It is therefore desired to provide an in-vehicle audio device capable of generating a sound image at a localized position in both a horizontal direction and a vertical direction of a passenger compartment of a motor vehicle by using existing speakers mounted to a motor vehicle with a simple structure.

An exemplary embodiment provides an in-vehicle audio device having an audio signal supply section, an audio signal processing section and an audio output section. The audio signal supply section supplies an audio signal. The audio signal processing section performs a signal process of supplying a sound image corresponding to the audio signal transmitted from the audio signal supply section. The audio signal processing section has space transfer characteristics compensation section and a vehicle height characteristic compensation section. The space transfer characteristic compensation section applies an inverse function of a transfer function to the audio signal transmitted from the audio signal supply section. The transfer function expresses a space transfer characteristics in a passenger compartment of a host vehicle to which the in-vehicle audio device is mounted. The vehicle height characteristic compensation section performs a filtering process of the audio signal supplied from the space transfer characteristics compensation section on a basis of the transfer function according to a vehicle height of the host vehicle. The audio output section outputs a sound to generate a sound image on the basis of the audio signal output from the audio signal processing section.

The in-vehicle audio device according to an exemplary embodiment can provide audio, i.e. sound to the driver and the fellow passenger of the host vehicle with the same conditions regardless of the change of the environment of the inside of the passenger compartment of the host vehicle because of using the space transmission compensation function $G0(s)^{-1}$. That is, although the transmission of sound in the passenger compartment of the host vehicle is changed according to the inside environment of the passenger compartment, it is possible to alien the frequency characteristics of the audio signal by applying an inverse function of the transfer function, which expresses the space transmission characteristics, to the sound signal.

Still further, it is possible for the vehicle height characteristic compensation section to adjust the sound image in a vertical direction. This makes it possible for the driver of the host vehicle to hear the audio, i.e. the sound at an optimum position corresponding to the height of the host vehicle. That is, the vehicle height characteristic compensation section adjusts the sound image in the vertical direction by performing the filtering to the audio signal on the basis of the transfer function.

Accordingly, because the driver of the host vehicle is difficult in general to feel a speed of the host vehicle when the vehicle height is high, it is possible for the driver of the host vehicle to correctly feel the actual speed of the host vehicle by guiding the visual line of the driver to be down. On the other hand, it is possible for the driver of the host vehicle to correctly feel the actual speed of the host vehicle by guiding the visual line of the driver to rise when the vehicle height is low. The in-vehicle audio device according to the exemplary embodiment performs the control to guide the visual line of the driver to a correct height (and a correct distance) without using any additional speakers to be arranged at a different vertical height in the passenger compartment of the host vehicle.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
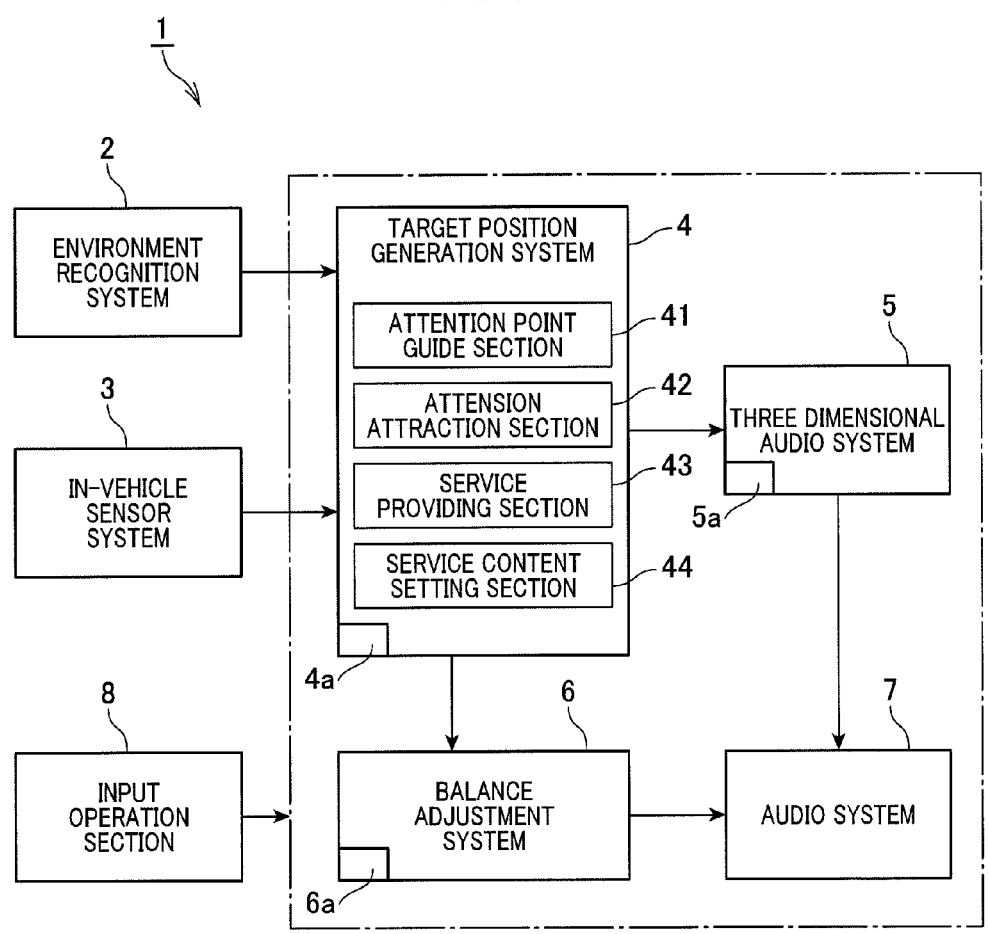
FIG. 1 is a view showing a block diagram of a structure of an in-vehicle audio device 1 according to an exemplary embodiment of the present invention.

Hereinafter, various embodiments of the present invention will be described with reference to the accompanying drawings. In the to following description of the various embodiments, like reference characters or numerals designate like or equivalent component parts throughout the several diagrams.

Exemplary Embodiment

A description will be given of an in-vehicle audio device 1 according to an exemplary embodiment with reference to FIG. 1 to FIG. 5A and FIG. 5B.

FIG. 1 is a view showing a block diagram of a structure of an in-vehicle audio device 1 according to an exemplary embodiment.

<Entire Structure of in-Vehicle Audio Device 1>

The in-vehicle audio device 1 according to the exemplary embodiment is mounted to a motor vehicle (hereinafter, also referred to as the "host vehicle") and has a function of generating a sound image in a direction of an attention object in order to guide a visual line of a driver of the host vehicle to a localized position of the generated sound image. This function is also referred to as the "visual line guide function".

As shown in FIG. 1, the in-vehicle audio device 1 according to the exemplary embodiment is comprised of an environment recognition system 2, an in-vehicle sensor system 3, a target position generation system 4, a three dimensional audio system 5, a balance adjustment system 6, an audio system 7, and an input operation section 8. The driver of the host vehicle operates the input operation section 8 to transmit various instructions to the in-vehicle audio device 1.

The environment recognition system 2 is comprised of at least a navigation system, an outside camera and an inside camera. The navigation system is widely known and easily available in the commercial market. The outside camera is mounted to an outside body of the host vehicle and takes an outside view, i.e. a surrounding scene of the host vehicle. The inside camera is mounted to the inside of a passenger compartment of the host vehicle and takes an inside scene of the passenger compartment of the host vehicle. That is, the environment recognition system 2 detects the outside environment and the inside environment of the host vehicle. The navigation system has at least map information (regarding road information and facility information) stored in a memory section, a global positioning system (GPS) and a function to search and fetch map information from the memory section. The navigation system displays a map around the position of the host vehicle on a display section. The navigation system performs a process of displaying a current position of the host vehicle on the map displayed on the display section. Further, the navigation system performs a process of searching and fetching a position of a destination and/or a facility on route guidance. The outside camera is arranged on the host vehicle to take at least a front view of the host vehicle. The inside camera is arranged on the host vehicle to take the head of the driver and a scene around the head of the driver of the host vehicle. In particular, the inside camera takes an image of the face of the driver of the host vehicle.

The in-vehicle sensor system 3 has at least a wheel speed sensor and a gyro sensor. The in-vehicle sensor system 3 receives a detection signal transmitted from the wheel speed sensor and detects a vehicle speed of the host vehicle on the basis of the received detection signal. The in-vehicle sensor system 3 receives a detection signal transmitted from the gyro sensor and detects a rate of yaw of the host vehicle on the basis of the received detection signal.

A user, i.e. the driver of the host vehicle operates the input operation section 8 in order to provide various instructions to the in-vehicle audio device 1. The input operation section 8 has various types of push buttons and a touch panel, etc. The touch panel and the display section are assembled together.

Each of the target position generation system 4, the three dimensional audio system 5 and the balance adjustment system 6 is comprised of a computer which is widely known, and performs a process which will be described later. As shown in FIG. 1, the target position generation system 4, the three dimensional audio system 5 and the balance adjustment system 6 is equipped with a memory 4a, a memory 5a and a memory 6a, respectively. Each of the memory 4a, the memory 5a and the memory 6a stores a corresponding software program with which the corresponding process is performed. These processes are explained later. The three dimensional audio system 5 corresponds to the sound image localization section used in the claims.

<Audio System>

Figure 2:
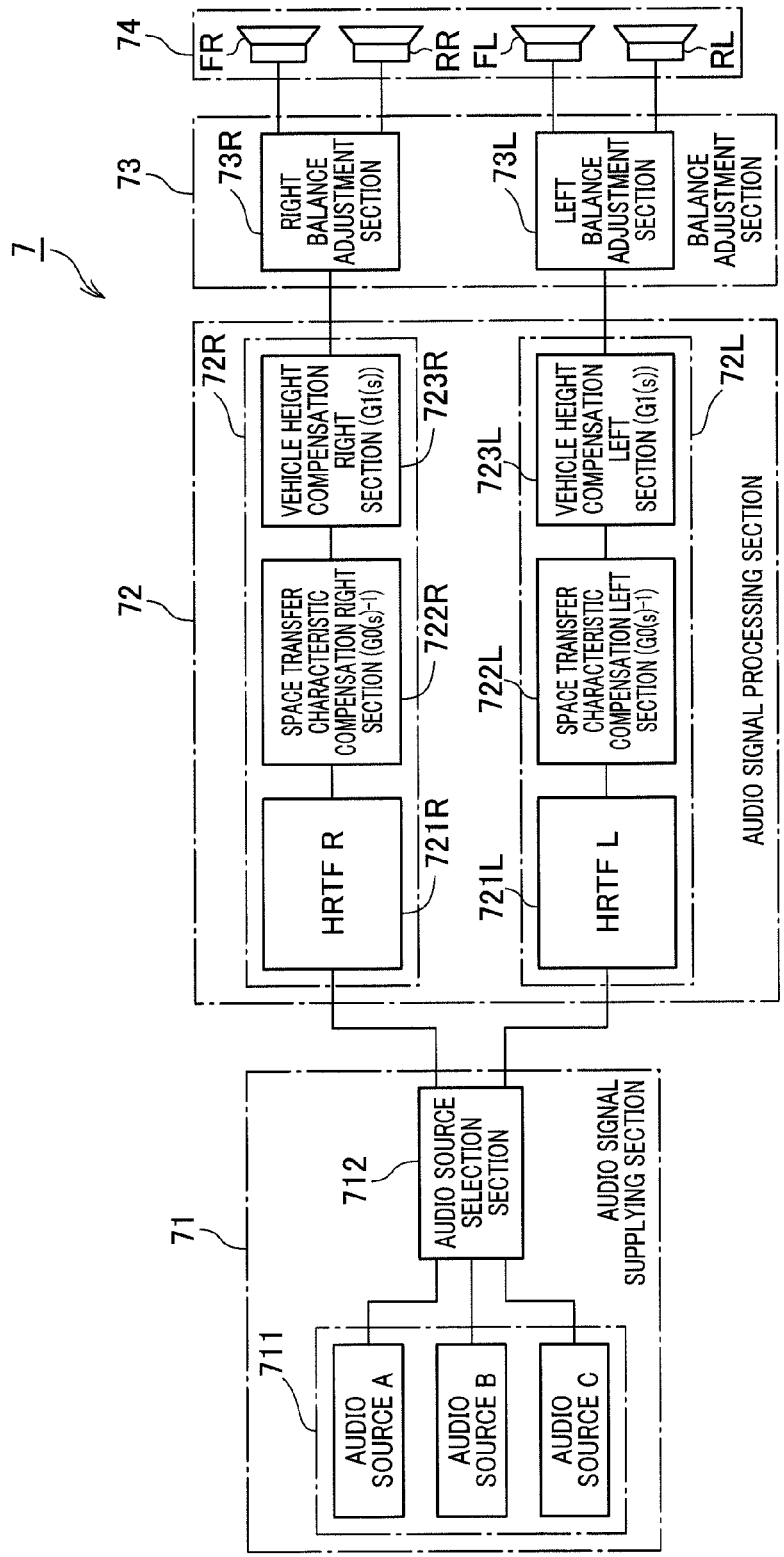
FIG. 2 is a view showing a block diagram showing an audio system 7 in the in-vehicle audio device 1 according to the exemplary embodiment shown in FIG. 1.

FIG. 2 is a view showing a block diagram showing an audio system 7 in the in-vehicle audio device 1 according to the exemplary embodiment shown in FIG. 1. As shown in FIG. 2, the audio system 7 has an audio signal supplying section 71, an audio signal processing section 72, a balance adjustment section 73, and an audio signal output section 74.

The audio signal output section 74 is equipped with a front right speaker FR, a rear right speaker RR, a front left speaker FL, and a rear left speaker RL. The front right speaker FR is arranged at a right side in front of the driver of the host vehicle. The rear right speaker RR is arranged at a right side behind the driver of the host vehicle. The front left speaker FL is arranged at a left side in front of the driver of the host vehicle. The rear left speaker RL is arranged at a left side behind the driver of the host vehicle. That is, both the front right speaker FR and the front left speaker FL are arranged at least at a different horizontal position. In the following description, both the front right speaker FR and the front left speaker FL are also referred as the front speakers, and both the rear right speaker RR and the rear left speaker RL are also referred as the rear speakers.

The audio signal supplying section 71 is comprised of an audio source group 711 and an audio source selection section 712. The audio source group 711 is comprised of a plurality of audio sources a, B and C, for example, a compact disk (CD) audio source, a radio broadcasting audio source, a user audio source generated by an user, etc. The audio source selection section 712 selects one of the audio sources in the audio source groups on the basis of an instruction signal transmitted from the input operation section 8 handled the operator such as the driver of the host vehicle. The audio source selection section 712 divides audio signals transmitted form the selected audio source into a right audio signal and a left audio signal, and provides the right audio signal and the left audio signal to the audio signal processing section 72.

The audio signal processing section 72 is equipped with a right audio signal processing section 72R and a left audio signal processing section 72L.

The right audio signal processing section 72R performs a process of filtering the right audio signal, transmitted from the audio source selection section 712, on the basis of a transfer function. Similarly, the left audio signal processing section 72L performs a process of filtering the left audio signal, transmitted from the audio source selection section 712, on the basis of a transfer function.

The right audio signal processing section 72R and the left audio signal processing section 72L transmit the right audio signal and the left audio signal after the filtering process to the balance adjustment section 73.

As shown in FIG. 2, the right audio signal processing section 72R is comprised of a head related transfer function right block 721R, a space transfer characteristic compensation right section 722R and a vehicle height compensation function right section 723R. The head related transfer function right block 721R in the right audio signal processing section 72R generates a head related transfer function H(s). The space transfer characteristic compensation right section 722R in the right audio signal processing section 72R generates a space transmission compensation function $G0(s)^{-1}$. The vehicle height compensation function right section 723R in the right audio signal processing section 72R generates a vehicle height compensation function G1(s).

Similarly, the left audio signal processing section 72L is comprised of a head related transfer function left section 721L, a space transfer characteristic compensation left section 722L and a vehicle height compensation function left section 723L. The head related transfer function left section 721L in the left audio signal processing section 72L generates a head related transfer function H(s). The space transfer characteristic compensation left section 722L in the left audio signal processing section 72L generates a space transmission compensation function $G0(s)^{-1}$. The vehicle height compensation function left section 723L in the left audio signal processing section 72L generates a vehicle height compensation function G1(s).

The head related transfer function right section 721R and the head related transfer function left section 721L correspond to the sound image generation section used in the claims.

The space transfer characteristic compensation right section 722R and the space transfer characteristic compensation left section 722L correspond to the space transfer characteristic compensation section used in the claims.

The vehicle height compensation function right section 723R and the vehicle height compensation function left section 723L correspond to the vehicle height compensation section used in the claims.

The head related transfer function H(s) is used for a known sound localization technique. That is, the head related transfer function H(s) represents transfer characteristics from a virtual audio source (as a target position which will be explained later) to eardrums of a listener, in particular the driver of the host vehicle.

The space transmission compensation function $G0(s)^{-1}$ is an inverse function of a space transfer function G0(s) which expresses characteristics of a reproduction audio field. An inverse filtering process is performed by using the space transmission compensation function $G0(s)^{-1}$ on the basis of a known transaural method.

The vehicle height compensation function G1(s) is used for performing filtering processing on the basis of the transfer function. Specifically, this filtering process adjusts the driver's eye according to a vehicle height. That is, when the more the vehicle height is increased, the more adjusts the focus point of the driver's eye is lowered, and on the other hand, when the more the vehicle height is decreased, the more adjusts the focus point of the driver's eye is increased. It is possible to use the filtering characteristics obtained by experiment so that an audio source is positioned at a predetermined angle of elevation/a predetermined angle of depression (for example, −40 [deg], −20 [deg], 0 [deg], and 40 [deg]). It is also possible to use characteristics which emphasis an experimentally-known specific frequency band relating to a height of the audio source.

The head related transfer function H(s) is selected on the basis of an instruction signal transmitted from the three dimensional audio system 5. That is, the right audio signal processing section 72R and the left audio signal processing section 72L usually have a different head related transfer function H(s), respectively. Specifically, when receiving an instruction signal transmitted from the three dimensional audio system 5, the audio system 7 selects, on the basis of the received instruction signal, one of, i.e. an optimum transfer function in plural transfer functions which are determined in advance and correspond to positions of the target object, respectively.

On the other hand, the space transmission compensation function $G0(s)^{-1}$ and the vehicle height compensation function G1(s) are determined on the basis of a kind of the host vehicle (a vehicle height of the host vehicle and a shape of the passenger compartment of the host vehicle). In particular, the inverse function of the space transfer function G0(s) is used as the space transmission compensation function $G0(s)^{-1}$, where the inverse function of the space transfer function G0(s) is obtained on the basis of detection results of the space transfer characteristics of the passenger compartment of the host vehicle. One of plural functions which are prepared in advance is selected as the vehicle height compensation function G1(s) on the basis of the height of the host vehicle.

The balance adjustment section 73 is comprised of a right balance adjustment section 73R and a left balance adjustment section 73L. The right balance adjustment section 73R divides a right audio signal, which has been processed by the filtering process transmitted from the right audio signal processing section 72R, into two audio signals and provides the divided audio signals to the front right speaker FR and the rear right speaker RR. In addition, an amplitude, etc. of each of the divided audio signals is adjusted on the basis of an instruction signal transmitted from the input operation section 8 operated by the driver of the host vehicle or an instruction signal transmitted from the balance adjustment system 6. This makes it possible to adjust a volume of sound and a sound balance in each of the front right speaker FR and the rear right speaker RR.

Similarly, the left balance adjustment section 73L divides a left audio signal, which has been processed by the filtering process transmitted from the left audio signal processing section 72L, into two audio signals and provides the divided audio signals to the front left speaker FL and the rear left speaker RL. In addition, an amplitude, etc. of each of the divided audio signals is adjusted on the basis of an instruction signal transmitted from the input operation section 8 operated by the driver of the host vehicle or an instruction signal transmitted from the balance adjustment system 6. This makes it possible to adjust a volume of sound and a sound balance in each of the front left speaker FL and the rear left speaker RL.

That is, because both the right balance adjustment section 73R and the left balance adjustment section 73L are working together, it is possible to adjust the balance between the group of the front right speaker FR and the front left speaker FL and the group of the rear right speaker RR and the rear left speaker RL. It is further possible for each of the right balance adjustment section 73R and the left balance adjustment section 73L to independently adjust the volume in order to adjust the balance between the group of the front right speaker FR and the rear right speaker RR and the group of the front left speaker FL and the rear left speaker RL.

In the audio system 7 having the structure previously described, when the head related transfer function H(s) is determined, which corresponding to the target position on the basis of the instruction signal transmitted from the three dimensional audio system 5, the sound image generated by the audio system 7 is localized. That is, the driver of the host vehicle recognizes that the sound image is generated at the target position and transmitted from the target object.

<Target Position Generation System 4>

When the visual line guide function is performed, the target position generation system 4 generates the position of the target object as an instruction value to be transmitted to the three dimensional audio system 5. As shown in FIG. 1, the three dimensional audio system 5 is comprised of an attention point guide section 41, an attention attraction section 42, a service providing section 43, and a service content supplying section 44. The target position generation system 4 corresponds to the target position generation section used in the claims.

The attention point guide section 41 performs a process of generating a target position to guide the visual line of the driver to an optimum position (as the position to which the driver of the host vehicle pays the attention) which corresponds to the current position of the host vehicle, the driving state of the host vehicle and a driving environment around the host vehicle. The process is repeatedly performed to generate an updated target position every predetermined constant period. Specifically, the attention point guide section 41 estimates an attention position to pay attention to on the basis of a current position of the host vehicle, a driving state (vehicle speed and a yaw rate) of the host vehicle and a driving environment after N seconds later (N is an integer of not less than zero) counted from a current time by using information provided from the environment recognition system 2 and the in-vehicle sensor system 3. It is for example possible to estimate an attention position to pay attention to by a method disclosed in Japanese patent NO. 4735676.

Instead of using a curvature of the current road on which the host vehicle is now running, it is possible to use a value a vehicle speed of another vehicle, a condition of the current road (the presence of an obstacle, a frozen state, a water puddle, deposited snow, a crack, uneven surface on the road), a brightness at the outside of the host vehicle, etc. as the driving environment of the host vehicle to be used for determining the attention position to pay attention to.

When detecting a temporary attention object, for example, a pedestrian, an obstacle, etc. which is present in front of the host vehicle, the attention attraction section 42 performs a process of generating a target position for the detected temporary attention object in order to guide the visual line of the driver of the host vehicle to the target position of the detected temporary attention object to pay his attention.

The process is repeatedly performed every predetermined period. When a temporary object to pay attention to (as a temporary attention object) is detected, this process generates a target position of the temporary attention object. Specifically, the attention attraction section 42 receives image data captured by the outside camera in the environment recognition system 2, and performs image processing of the received image data in order to extract such a temporary attention object, and determines the target position of the temporary attention object. Because a method of extracting a specified object from captured image data and a method of determining a three dimensional position of the specified object are well known, the explanation of these methods is omitted here for brevity.

The service providing section 43 determines a time to rest on the basis of a degree of fatigue of the driver of the host vehicle, and a condition of a fellow passenger on the host vehicle. When detecting a time to rest, the service providing section 43 searches an available facility for rest around the current position of the host vehicle, and generates a target position regarding the searched facility in order to guide the visual line of the driver of the host vehicle.

The service providing section 43 performs the above process every predetermined period. When detecting the time to rest, the service providing section 43 generates the target position regarding the searched facility. Specifically, for example, the service providing section 43 determines a degree of fatigue of the driver, i.e. a time to rest on the basis of whether or not a continuous length of time during which the driver continuously drives the host vehicle without rest exceeds a predetermined threshold value. In this case, it is possible to adjust or switch the predetermined threshold value on the basis of information (for example, night driving, a driving in hazardous conditions such as rain and snow, driving on a frozen road, and driving on a freeway) provided from the environment recognition system 2. It is also sufficient to judge a condition of a fellow passenger (a complexion and a facial expression of a fellow passenger) by performing image processing of image data captured by the inside camera.

In addition to the function to guide the visual line of the driver of the host vehicle to a facility for rest previously described, it is acceptable for the service providing section 43 to have additional functions, for example, a function to guide the visual line of the driver of the host vehicle to a gas station on the basis of an amount of residual fuel, and/or a function to guide the visual line of the driver to an alarm lamp of the host vehicle when the alarm lamp lights.

The program content setting section 44 performs the process of determining, i.e. setting a target of the visual line of the driver to which the visual line of the driver of the host vehicle is guided during the execution of the visual line guide function on the basis of the instruction inputted through the input operation section 8 by the driver of the motor vehicle. This process is started when the driver of the motor vehicle operates or handles the input operation section 8 to select the target to which the visual line of the driver of the host vehicle is guided.

Figure 3:
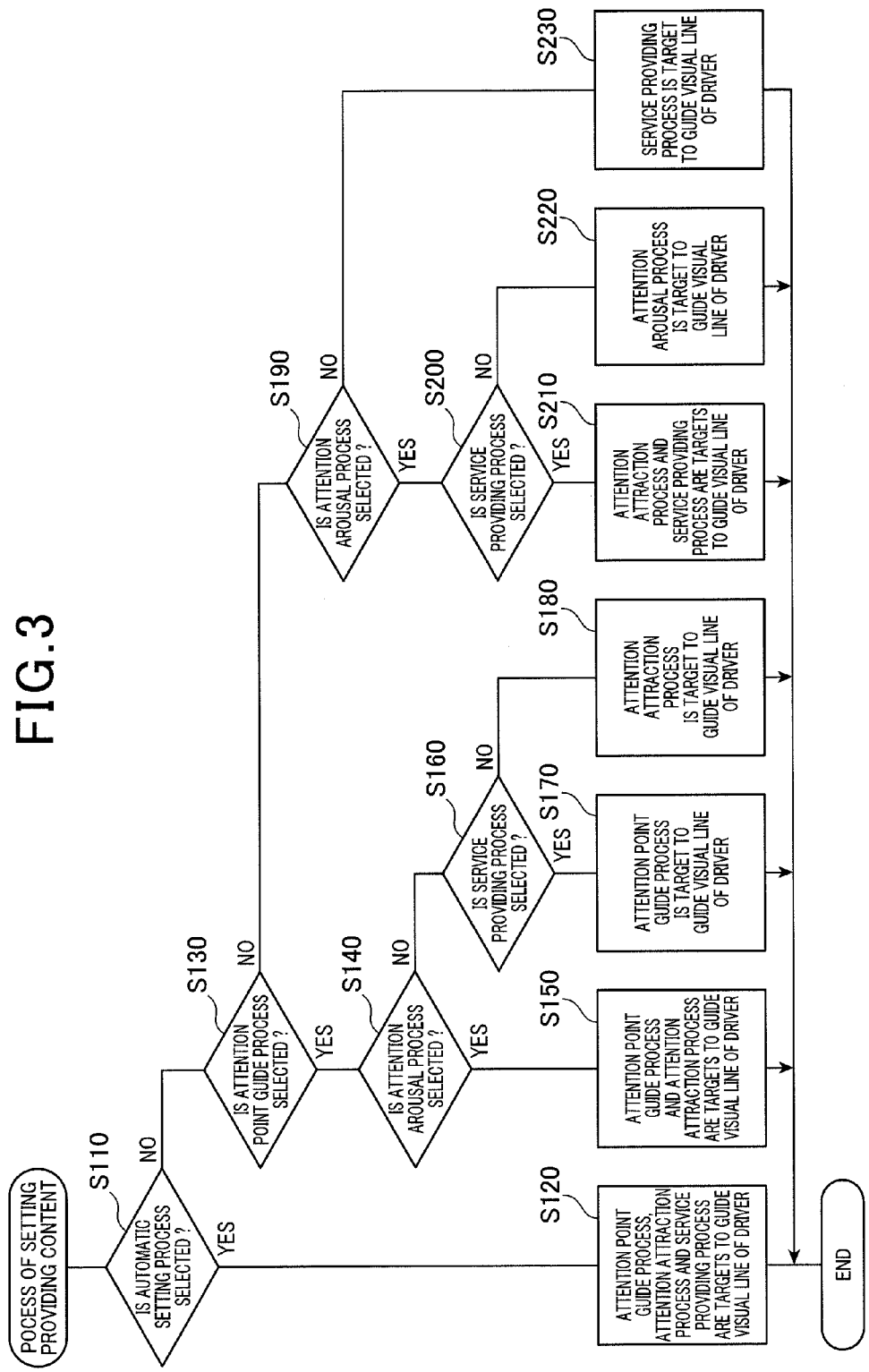
FIG. 3 is a view showing a flow chart of a process performed by a program content setting section 44 in a target position generation system 4 in the in-vehicle audio device 1 according to the exemplary embodiment shown in FIG. 1.

FIG. 3 is a view showing a flow chart of the process performed by the program content setting section 44 in the target position generation system 4 in the in-vehicle audio device 1 according to the exemplary embodiment shown in FIG. 1.

When the routine indicated by the flow chart shown in FIG. 3 is started, the guide to encourage the driver of the host vehicle to perform a necessary input to the input operation section 8 by using the display section mounted to the host vehicle and/or sound.

In step S110 shown in FIG. 3, the program content setting section 44 detects whether or not the driver of the host vehicle inputs an instruction to perform an automatic setting process. When the detection result indicates affirmation ("YES" in step S110), the operation flow goes to step S120.

In step S120, the program content setting section 44 determines that all of the "attention point guide process", the "attention attraction process" and the "service providing process" are the targets for guiding the visual line of the driver of the host vehicle. The program content setting section 44 completes the routine shown in FIG. 3.

On the other hand, when the detection result indicates negation ("NO" in step S110), the operation flow goes to step S130.

In step S130, the program content setting section 44 detects whether or not the attention point guide process is selected by the driver. When the detection result in step S130 indicates affirmation ("YES" in step S130), the operation flow goes to step S140.

In step S140, the program content setting section 44 detects whether or not the attention attraction process is selected by the driver of the host vehicle.

When the detection result in step S140 indicates affirmation ("YES" in step S140), the operation flow goes to step S150.

In step S150, the program content setting section 44 determines that both the attention point guide process and the attention attraction process are the targets for guiding the visual line of the driver of the host vehicle. The program content setting section 44 completes the routine shown in FIG. 3.

On the other hand, when the detection result in step S140 indicates negation ("NO" in step S140), the operation flow goes to step S160.

In step S160, the program content setting section 44 detects whether or not the service providing process is selected by the driver.

When the detection result in step S160 indicates affirmation ("YES" in step S160), the operation flow goes to step S170.

In step S170, the program content setting section 44 determines that both the attention attraction process and the service providing process are targets for guiding the visual line of the driver of the host vehicle. The program content setting section 44 completes the routine shown in FIG. 3.

On the other hand, when the detection result in step S160 indicates negation ("NO" in step S160), the operation flow goes to step S180.

In step S180, the program content setting section 44 determines that the attention attraction process is the target for guiding the visual line of the driver of the host vehicle. The program content setting section 44 completes the routine shown in FIG. 3.

When the detection result in step S130 indicates negation ("NO" in step S130), the operation flow goes to step S190.

In step S190, the program content setting section 44 detects whether or not the driver of the host vehicle inputs an instruction to perform the attention attraction section process. When the detection result indicates affirmation ("YES" in step S190), the operation flow goes to step S200.

In step S200, the program content setting section 44 detects whether or not the driver of the host vehicle inputs an instruction to perform the service providing process.

When the detection result indicates affirmation ("YES" in step S200), the operation flow goes to step S210.

In step S210, the program content setting section 44 determines that both the attention attraction process and the service providing process are the targets for guiding the visual line of the driver of the host vehicle. The program content setting section 44 completes the routine shown in FIG. 3.

On the other hand, when the detection result in step S200 indicates negation ("NO" in step S200), the operation flow goes to step S220.

In step S220, the program content setting section 44 determines that the attention attraction process is the target for guiding the visual line of the driver of the host vehicle. The program content setting section 44 completes the routine shown in FIG. 3.

When the detection result in step S190 indicates negation ("NO" in step S190), the operation flow goes to step S230.

In step S230, the program content setting section 44 determines that the service providing process is the target for guiding the visual line of the driver of the host vehicle. The program content setting section 44 completes the routine shown in FIG. 3.

That is, when the driver of the host vehicle selects the automatic setting process, the three processes, i.e. the attention point guide process, the attention attraction process and the service providing process are automatically determined as the target to guide the visual line of the driver of the host vehicle to the sound image.

On the other hand, when the driver of the host vehicle selects a manual selection, two or one selected from the three processes, i.e. the attention point guide process, the attention attraction process and the service providing process are selected as the targets for guiding the visual line of the driver of the host vehicle.

<Three Dimensional Audio System 5>

The three dimensional audio system 5 outputs audio signals without performing the audio signal process when the driver of the host vehicle does not select the visual line guide function through the input operation section 8.

On the other hand, when the driver of the host vehicle selects the visual line guide function through the input operation section 8, the three dimensional audio system 5 obtains the target position, to which the visual line of the driver of the host vehicle is guided, transmitted from the target position generation system 4. The three dimensional audio system 5 repeatedly outputs an instruction to the audio system 7 every predetermined period so that the audio system 7 sets the head related transfer function H(s) in order to localize a sound image at the target position.

By the way, when the target position generation system 4 outputs a plurality of target positions of plural types, the audio system 7 sets the head related transfer function H(s) of the target position having a highest priority in all of these target positions.

<Balance Adjustment System 6>

The balance adjustment system 6 switches from the condition determined by the audio system 7 to the condition suitable for the visual line guide function when the visual line guide service is provided. In addition, the balance adjustment system 6 sets the condition of the audio system 7 to its original condition when the visual line guide function is completed. This process performed by the balance adjustment system 6 is started when the visual line guide function is used, i.e. executed by the operation of the driver of the host vehicle to the input operation section 8.

The following description, it will be referred to as the "even" when the attention attraction section 42 or the service providing section 43 outputs a target position.

Figure 4:
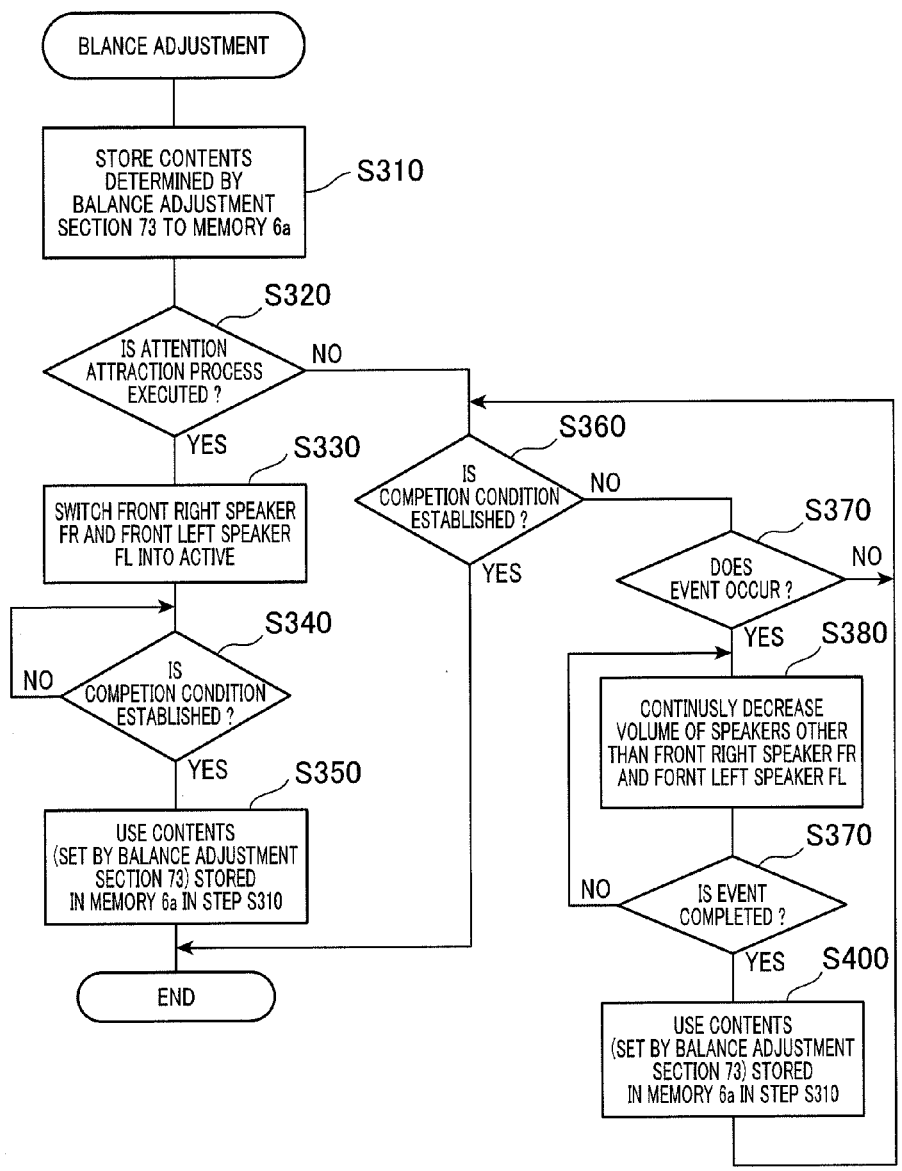
FIG. 4 is a view showing a flow chart of a process performed by a balance adjustment system 6 in the in-vehicle audio device 1 according to the exemplary embodiment shown in FIG. 1.

FIG. 4 is a view showing a flow chart of the process performed by the balance adjustment system 6 in the in-vehicle audio device 1 according to the exemplary embodiment shown in FIG. 1.

When the balance adjustment system 6 performs the routine indicated by the flow chart shown in FIG. 4, the balance adjustment system 6 stores the contents, which have been set by the balance adjustment section 73, into a memory field in the memory 6a (step S310). The operation flow then goes to step S320.

In step S320, the balance adjustment system 6 detects whether or not the program content setting section 44 in the target position generation system 4 determines the attention attraction process. That is, the balance adjustment system 6 detects whether or not the attention attraction process is a target to be executed.

When the detection result in step S320 indicates affirmation ("YES" in step S320), the operation flow goes to step S330.

In step S330, the balance adjustment system 6 switches the contents set by the balance adjustment section 73 in the audio system 7 so that only the front right speaker FR and the front left speaker FL become in active state. The operation flow goes to step S340

In step S340, the balance adjustment system 6 detects whether or not a completion condition to complete the visual line guide function is established. This complete condition includes that at least one of the driver of the host vehicle does not select to perform the visual line guide function through the input operation section 8 and the engine of the host vehicle stops.

When the detection result in step S340 indicates negation ("NO" in step S340), the process in step S340 is executed again. The process in step S340 is performed repeatedly until the detection result in step S340 indicates affirmation ("YES" in step S340).

When the detection result in step S340 indicates affirmation ("YES" in step S340), the operation flow goes to step S350.

In step S350, the balance adjustment system 6 fetches and uses the contents stored in the memory 6a in step S310 by the balance adjustment section 73 in the audio system 7. The balance adjustment system 6 completes the routine indicated by the flow chart shown in FIG. 4.

When the detection result in step S320 indicates negation ("NO" in step S320), i.e. when the detection result indicates the program content setting section 44 in the target position generation system 4 selects the attention attraction process, the operation flow goes to step S360.

In step S360, the balance adjustment system 6 detects whether or not a completion condition to complete the visual line guide function is established. Similar to the process in step S340, this complete condition used in step S360 includes that at least one of the driver of the host vehicle does not select to perform the visual line guide function through the input operation section 8 and the engine of the host vehicle stops.

When the detection result in step S360 indicates negation ("NO" in step S360), the operation flow goes to step S370.

In step S370, the balance adjustment system 6 detects whether or not the event is generated, i.e. a target position of the attention attraction process or the service providing process is generated.

When the detection result in step S370 indicates negation ("NO" in step S370), the operation flow returns back to step S360. The balance adjustment system 6 repeatedly performs the process in step S360 and the process in step S370 until the detection result in step S370 indicates affirmation, i.e. indicates that the event is generated.

When the detection result in step S360 indicates affirmation ("YES" in step S360), i.e. the completion condition is established, the balance adjustment system 6 completes the execution of the routine indicated by the flow chart shown in FIG. 4.

By the way, when the detection result in step S370 indicates affirmation ("YES" in step S370), i.e. when the detection result indicates that the event is generated, the operation flow goes to step S380.

In step S380, the balance adjustment system 6 performs the process of continuously decreasing the volume of the speakers other than the front right speaker FR and the front left speaker FL which are used for the visual line guide function. In order to perform this control to continuously decrease the volume of the speakers, the balance adjustment system 6 provides instructions to the balance adjustment section 73 in the audio system 7.

Figure 5A:
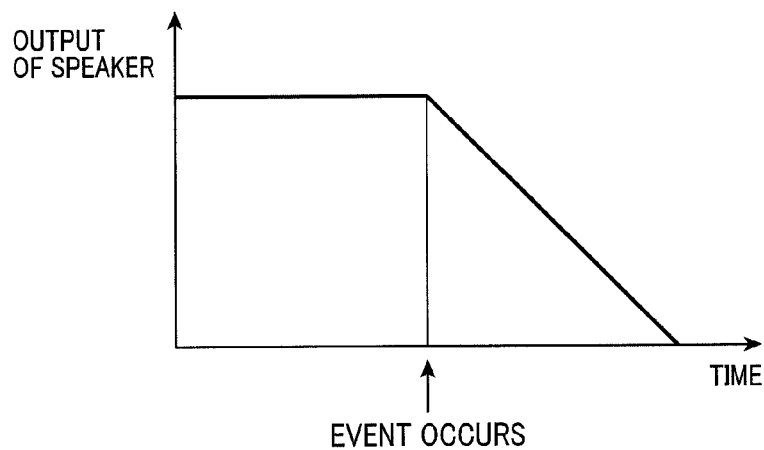
FIG. 5A is a graph showing a method of linearly decreasing a volume of sound outputted by an audio signal output section 74 in the audio system 7 according to the exemplary embodiment shown in FIG. 1.
Figure 5B:
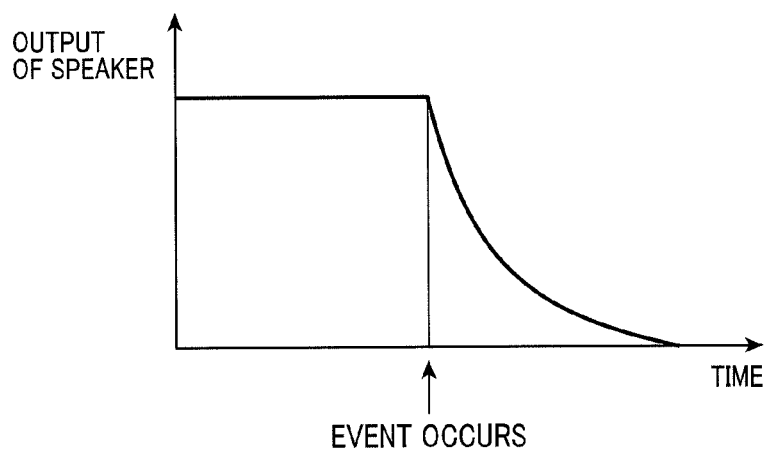
FIG. 5B is a graph showing another method of exponentially decreasing a volume of sound outputted by the audio signal output section 74 in the audio system 7 in the in-vehicle audio device 1 according to the exemplary embodiment shown in FIG. 1.

It is possible to linearly decrease the volume of the speakers as shown in FIG. 5A or to exponentially decrease the volume of the speakers as shown in FIG. 5B. That is, FIG. 5A is a graph showing a method of linearly decreasing a volume of sound outputted by an audio signal output section 74 in the audio system 7 according to the exemplary embodiment shown in FIG. 1. FIG. 5B is a graph showing another method of exponentially decreasing the volume of sound outputted by the audio signal output section 74 in the audio system 7 in the in-vehicle audio device 1 according to the exemplary embodiment shown in FIG. 1.

In step S390, the balance adjustment system 6 detects whether or not a completion condition to complete the visual line guide function is established. When the detection result in step S390 indicates negation ("NO" in step S390), i.e. the completion condition is not established, the operation flow returns back to step S380.

On the other hand, when the detection result in step S390 indicates affirmation ("YES" in step S390), i.e. the completion condition is established, the operation flow goes to step S400.

In step S400, the balance adjustment system 6 completes the execution of the routine indicated by the flow chart shown in FIG. 4.

When the balance adjustment system 6 returns the contents which have been set by the balance adjustment section 73 in the audio system 7 back to the contents previously stored into the memory 6a in step S310. The operation flow goes to step S360 in order for the balance adjustment system awaits for a next generation of an event.

That is, because the target position is repeatedly generated when the attention attraction process is a target of the visual line guide process, the balance adjustment system 6 uses the front right speaker FR and the front left speaker FL only in the audio signal output section 74 in the audio system 7 for the visual line guide function.

On the other hand, because an event irregularly occurs when the attention attraction process is not a target of the visual line guide process, the balance adjustment system 6 normally uses the audio system 7, and uses the front right speaker FR and the front left speaker FL only when the event occurs. In the latter case, because the volume of the front right speaker FR and the front left speaker FL is suddenly decreased to zero, the driver of the host vehicle may feel uncomfortable. In order to avoid this, the balance adjustment system 6 instructs the audio system 7 to gradually decreases the volume of the front right speaker FR and the front left speaker FL, for example, as shown in FIG. 5A and FIG. 5B.

<Effects>

As previously described in detail, the in-vehicle audio device 1 according to the exemplary embodiment uses the space transmission compensation function $G0(s)^{-1}$ and the vehicle height compensation function $G1(s)$ in addition to the head related transfer function $H(s)$.

Because the in-vehicle audio device 1 according to the exemplary embodiment uses the space transmission compensation function $G0(s)^{-1}$, it is possible to provide audio such as sound to the driver and the fellow passenger of the host vehicle with the same conditions regardless of the change of the environment of the inside of the passenger compartment of the host vehicle. In addition to this effect, it is possible to adjust the audio in the vertical direction of the passenger compartment of the host vehicle by the effects obtained by using the vehicle height compensation function $G1(s)$. As a result, this makes it possible to guide the visual line of the driver of the host vehicle to an optimum height and a distance according to the height of the host vehicle without using any additional speaker.

Accordingly, the in-vehicle audio device 1 according to the exemplary embodiment can select one of the plural audio sources A, B and C to be used for the visual line guide process. This makes it possible to effectively guide the visual line of the driver of the host vehicle to the target position as the sound mage localization.

OTHER MODIFICATIONS

The concept of the present invention is not limited by the exemplary embodiment previously described. It is possible to have various modifications.

For example, one of the functions such as the visual line guide function into a plurality of components, and on the other hand, to combine the functions into a single function, and to replace at least a part of the functions to a component having a known structure.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. An in-vehicle audio device comprising:
 an audio signal supplying device which supplies an audio signal;
 an audio signal processing device which performs a signal process of supplying a sound image corresponding to the audio signal transmitted from the audio signal supplying device, the audio signal processing device comprising:
 a space transfer characteristic compensation device which applies an inverse function of a transfer function to the audio signal transmitted from the audio signal supplying device, the transfer function expressing space transfer characteristics in a passenger compartment of a host vehicle to which the in-vehicle audio device is mounted; and
 a vehicle height characteristic compensation device which performs a filtering process of the audio signal supplied from the space transfer characteristic compensation device on a basis of the transfer function according to a vehicle height of the host vehicle, and
 an audio output device which outputs a sound to generate the sound image on the basis of the audio signal output from the audio signal processing device.

2. The in-vehicle audio device according to claim 1, wherein the vehicle height characteristic compensation device processes the audio signal in order to generate the sound image by guiding a visual line of a driver of the host vehicle to rise when the vehicle height of the host vehicle is increased, and by guiding the visual line of the driver of the host vehicle to fall when the vehicle height of the host vehicle is decreased.

3. The in-vehicle audio device according to claim 1, wherein the audio output device comprises at least a pair of speakers arranged in a different horizontal position in the passenger compartment of the host vehicle, wherein the audio signal processing device further comprises a sound image generation device which applies a transfer function to the audio signal, where the transfer function is necessary to generate the sound image by the pair of the speakers.

4. The in-vehicle audio device according to claim 3, further comprising a sound image localization device which obtains a target position at which the sound image is localized, and instructs the audio signal processing device so that the sound image generation device applies the transfer function to the audio signal in order to localize the sound image at the target position.

5. The in-vehicle audio device according to claim 1, wherein the audio signal supplying device comprises an audio source selection device which selects one of a plurality of audio sources.

6. The in-vehicle audio device according to claim 2, wherein the audio output device comprises at least a pair of speakers arranged in a different horizontal position in the passenger compartment of the host vehicle, wherein the audio signal processing device further comprises a sound image generation device which applies a transfer function to the audio signal, where the transfer function is necessary to generate the sound image by the pair of the speakers.

7. The in-vehicle audio device according to claim 2, wherein the audio signal supplying device comprises an audio source selection device which selects one of a plurality of audio sources.

8. The in-vehicle audio device according to claim 3, wherein the audio signal supplying device comprises an audio source selection device which selects one of a plurality of audio sources.

9. The in-vehicle audio device according to claim 4, wherein the audio signal supplying device comprises an audio source selection device which selects one of a plurality of audio sources.

* * * * *